United States Patent [19]

Schroeder et al.

[11] Patent Number: 5,549,507
[45] Date of Patent: Aug. 27, 1996

[54] COMBINED MOTOR AND MECHANICAL DRIVE FOR USE IN OSCILLATING SPINDLE SANDER

[75] Inventors: James D. Schroeder, St. Peters; George E. Hendrix, Florissant, both of Mo.

[73] Assignee: Emerson Electric Co., St. Louis, Mo.

[21] Appl. No.: 233,278

[22] Filed: Apr. 26, 1994

[51] Int. Cl.$^6$ ............................................ B24B 7/00
[52] U.S. Cl. .......................... 451/121; 451/157; 74/22 R
[58] Field of Search ................................. 451/157, 120, 451/121; 74/22 R, 57

[56] References Cited

U.S. PATENT DOCUMENTS

| | | | |
|---|---|---|---|
| 1,189,557 | 7/1916 | Gardner | 451/157 |
| 2,575,442 | 11/1951 | Cooley | 74/22 R |
| 3,812,574 | 5/1974 | Jones et al. | 74/22 R |
| 3,855,869 | 12/1974 | Dimitrov | 74/22 R |
| 3,868,791 | 3/1975 | Burns . | |
| 3,903,657 | 9/1975 | Pfister . | |
| 4,558,538 | 12/1985 | Green . | |
| 4,821,457 | 4/1989 | Innuzzi . | |
| 4,889,613 | 12/1989 | McNeal et al. | 74/57 |
| 5,045,741 | 9/1991 | Dvorsky . | |
| 5,335,560 | 8/1994 | Wang | 74/22 R |
| 5,402,604 | 4/1995 | Hashii et al. | 74/22 R |
| 5,412,889 | 5/1995 | Hou | 74/22 R |

Primary Examiner—Bruce M. Kisliuk
Assistant Examiner—Thomas W. Lynch
Attorney, Agent, or Firm—Polster, Lieder, Woodruff & Lucchesi

[57] ABSTRACT

A combined motor and mechanical drive that is used with an oscillating spindle sander is disclosed. The oscillating spindle sander has a worktable for supporting a workpiece. A spindle extends upwardly through the worktable and has a sanding surface. An electrical motor is supported by the worktable and includes a shaft for imparting rotational motion to the spindle. The mechanical drive is contained within a housing that is supported by the motor and is connected to the motor shaft for imparting reciprocal or axial motion in addition to rotary motion to the spindle. The mechanical drive includes a speed reducer that is coaxial with the motor shaft. The speed reducer drives a cam follower that engages a cam in the housing for imparting reciprocal motion to the spindle at a rate much less than the rotational speed imparted to the motor shaft by the motor. The speed reducer includes a cycloidal gear that engages a complementary ring gear provided in the housing. The combined motor and mechanical drive is disclosed as being particularly useful in connection with oscillating spindle sanders; however, other applications are also contemplated.

18 Claims, 7 Drawing Sheets

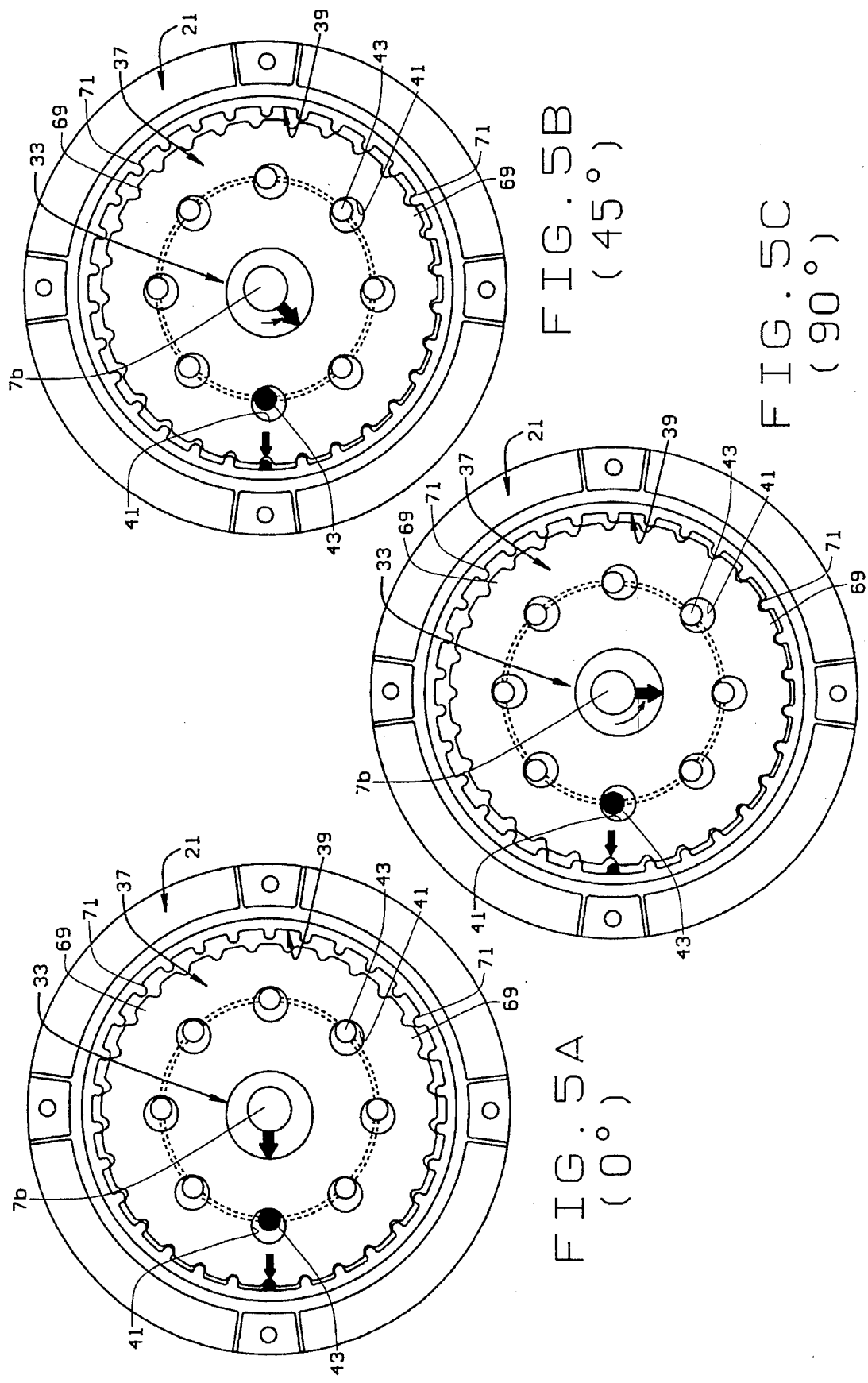

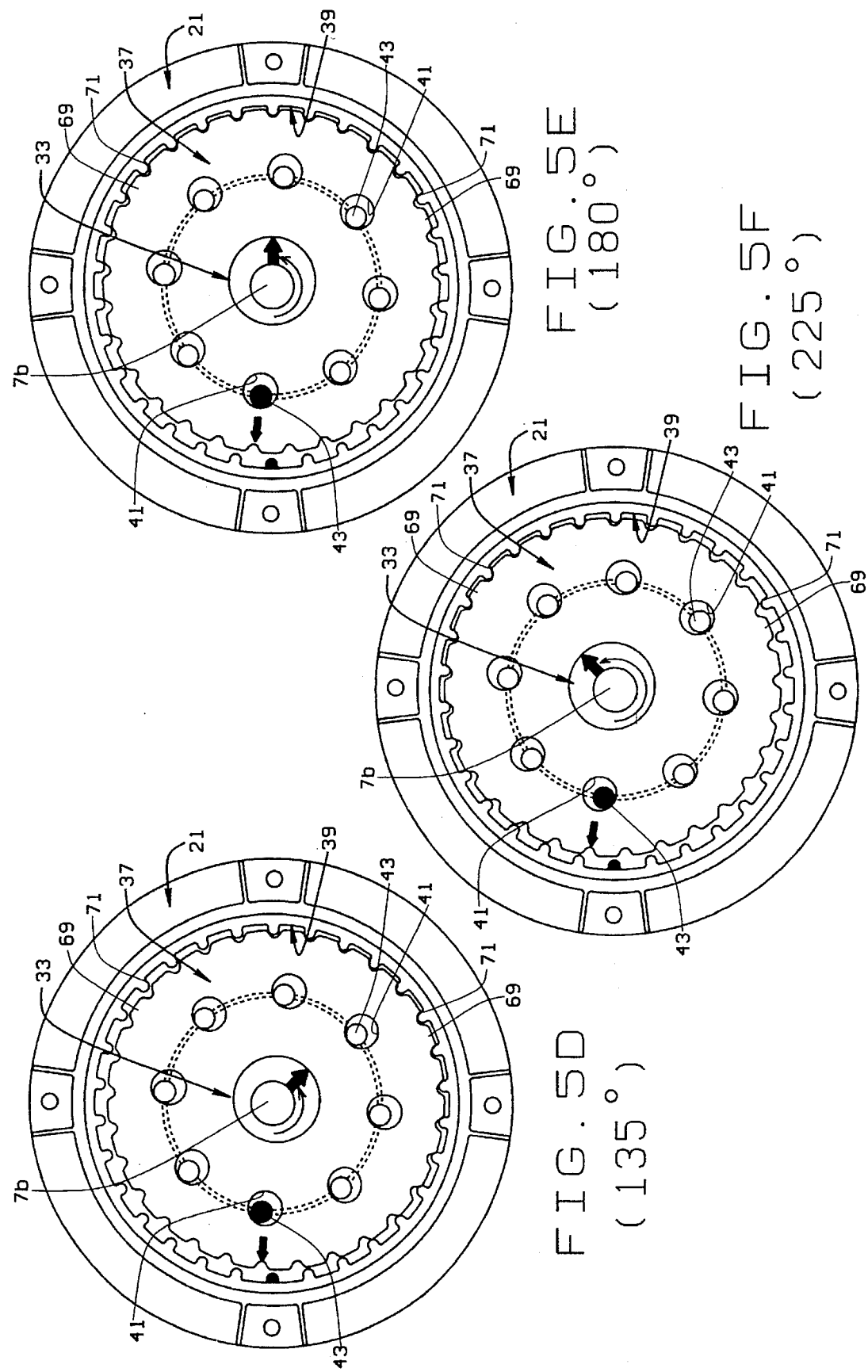

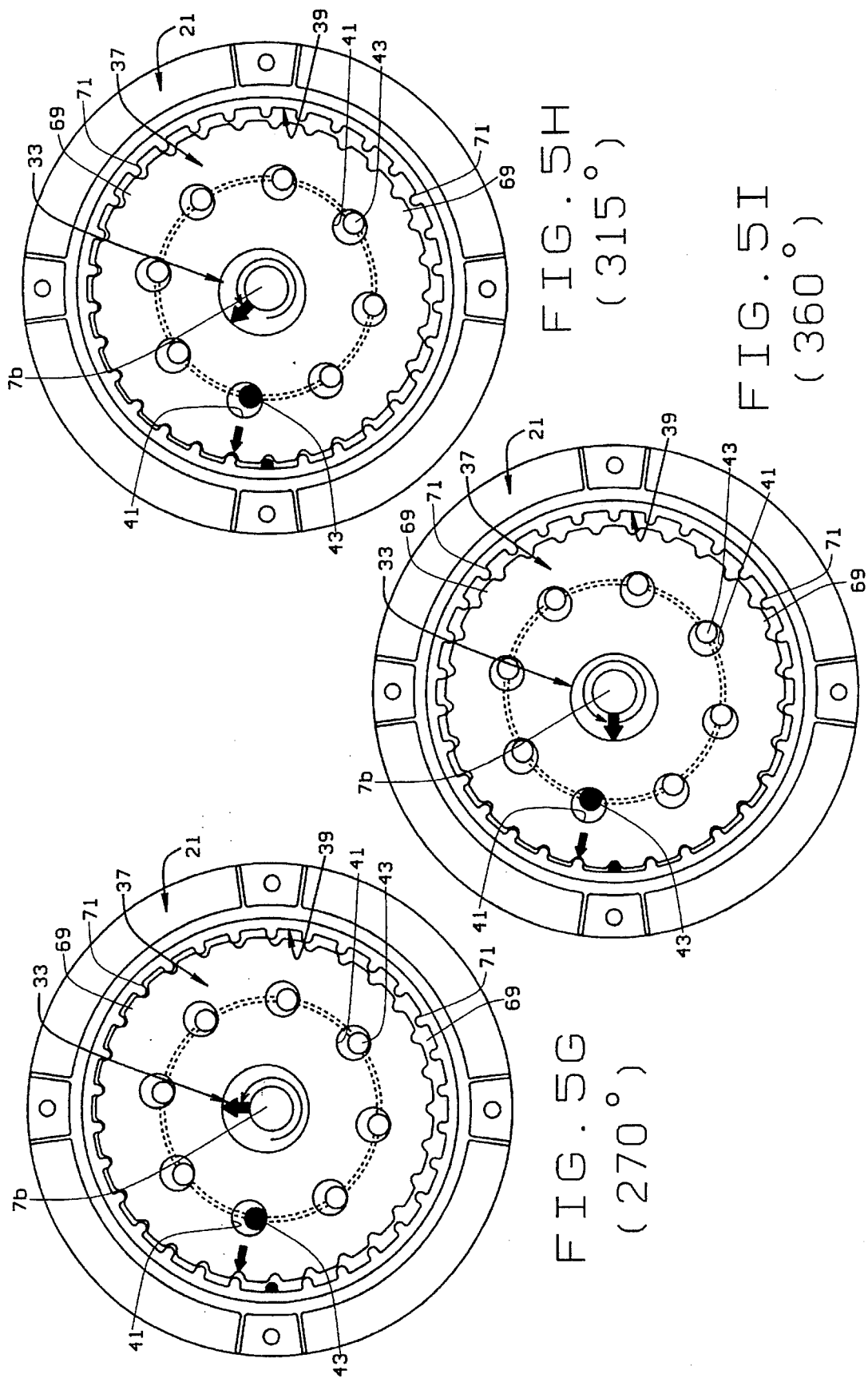

5,549,507

COMBINED MOTOR AND MECHANICAL DRIVE FOR USE IN OSCILLATING SPINDLE SANDER

BACKGROUND OF THE INVENTION

The present invention relates to a spindle or drum sander, and more particularly, to an oscillating spindle sander tool employing a combined motor and mechanical drive that provides both rotary and reciprocal or axial movement to the spindle, thus providing the oscillating movement desired for spindle sanders. The combined motor and mechanical drive has other applications, as well.

Spindle sanders, when viewed from the exterior, appear to be very simple mechanisms. All that an untrained viewer can see is an enclosed frame with a horizontally extending worktable through which a vertically extending spindle sander projects. When the spindle sander is operated, the viewer can readily see that the spindle sander both rotates as well as reciprocates or moves in an axial path. This would suggest to the viewer that there is something more than expected within the enclosed frame to provide the simultaneous rotary and reciprocal or axial movement of the spindle sander.

Those skilled in the art are immediately aware of the costly and complex mechanisms that have been required for producing the simultaneous rotary and reciprocal or axial movement of the spindle sander. Typically, such mechanisms include pulleys, cylinders, cams, gears and the like which are constructed in various arrangements and which operate in conjunction with an electrical motor to produce the simultaneous bi-directional movement desired. Prior art spindle sanders have also required the use of a spindle shaft separate from the motor shaft. As is also well known by those skilled in the art, the complex prior art arrangements not only add substantial cost to oscillating spindle sanders, but also increase the likelihood of a malfunction due to the substantial number of moving parts that are required.

The prior art has long recognized the need for a reliable, efficient and cost effective mechanism which produces simultaneous rotary and reciprocal or axial movement for use in such applications as oscillating spindle sanders. As will be apparent from the detailed discussion that follows, the present invention overcomes many of the complex and costly mechanisms employed in prior art devices.

SUMMARY OF THE INVENTION

Among the several objects and advantages of the present invention include:

A new and improved combined motor and mechanical drive that provides simultaneous rotary and reciprocal or axial movement for use with an oscillating spindle sander or the like;

The provision of the aforementioned combined motor and mechanical drive that overcomes the problems associated with the complex and expensive mechanisms employed by prior art approaches;

The provision of the aforementioned new and improved combined motor and mechanical drive which is reliable, efficient and cost effective as compared with prior art mechanisms;

The provision of the new and improved combined motor and mechanical drive that includes an electric motor for imparting rotational movement to an output shaft and a mechanical drive contained within a housing that is supported by the motor in which the mechanical drive is connected to the output shaft for imparting reciprocal or axial motion as well to the motor output shaft;

The provision of the aforementioned new and improved combined motor and mechanical drive which is made of a minimum number of parts, is easy to construct and maintain, is durable and long lasting in operation, and is relatively economical to produce, particularly as compared to prior art mechanisms.

Briefly stated, the present invention discloses both a combined motor and mechanical drive that imparts both axial and rotational movement to a motor shaft, as well as specifically to an oscillating spindle sander which employs the aforementioned combined motor and mechanical drive.

The mechanical drive motor that imparts both axial and rotational movement to a motor shaft is constructed to be supported by the motor as well as being connected to the motor shaft for imparting axial motion to the motor shaft during rotation of the motor shaft by the motor. The mechanical drive is contained within a housing that is supported by the motor.

The mechanical drive includes means for imparting axial motion to the motor shaft at a rate much less than the rotational speed of the motor shaft. For this purpose, a speed reducer drive is incorporated in the mechanical drive which drives a cam follower that engages a cam in the housing for imparting axial motion to the motor shaft during rotation thereof. The speed reducer includes a cycloidal gear that engages a complementary ring gear provided in the housing. For the oscillating spindle sander, a spindle extends upwardly through a worktable and includes a sanding surface. An electrical motor is supported by the worktable and includes a shaft for imparting rotational motion to the spindle. A mechanical drive is supported by the motor that is connected to the motor shaft for imparting axial motion to the shaft and the spindle during rotary movement thereof.

The mechanical drive is contained within a housing that is supported below the motor, the mechanical drive being connected to both the shaft and the housing for imparting the reciprocal or axial movement of the motor shaft and spindle.

The motor shaft includes upper and lower shaft portions that extend from upper and lower ends of the motor. The upper shaft portion constitutes the motor output shaft for imparting rotational and axial motion to the spindle. The lower shaft portion is contained within the housing and is connected to the mechanical drive for imparting axial motion to the rotating motor output shaft and spindle.

The lower shaft portion drives a speed reducer within the housing that is coaxial with the lower shaft portion. The speed reducer drives a cam follower that engages a cam in the housing for imparting axial motion to the rotating motor output shaft and spindle. The speed reducer includes a cycloidal gear that engages a complementary ring gear provided in the housing.

The lower shaft portion includes an eccentric that engages gear teeth of the cycloidal gear for engagement with corresponding gear teeth in the ring gear, the cycloidal gear driving the cam follower into engagement with the cam provided in the housing. The cycloidal gear has less teeth than the ring gear.

The cam follower includes depending leg portions for engaging the cam provided in the housing. The cam follower includes pins for engaging corresponding holes in the cycloidal gear, the holes being sized to provide continuous line contact between each pin and hole.

These and other objects and advantages of the present invention will become apparent from the description that follows.

BRIEF DESCRIPTION OF THE DRAWINGS

In the drawings.

FIG. 5A is a partially schematic top plan view of the mechanical drive illustrating the position of the cycloid gear and housing ring gear relative to the output element/cam follower and eccentric where the position of the motor shaft is illustrated by associated arrow at 0° rotation.

FIG. 5B is a partially schematic top plan view of the mechanical drive illustrating the position of the cycloid gear and housing ring gear relative to the output element/cam follower and eccentric where the position of the motor shaft is illustrated by associated arrow at 45° rotation.

FIG. 5C is a partially schematic top plan view of the mechanical drive illustrating the position of the cycloid gear and housing ring gear relative to the output element/cam follower and eccentric where the position of the motor shaft is illustrated by associated arrow at 90° rotation.

FIG. 5D is a partially schematic top plan view of the mechanical drive illustrating the position of the cycloid gear and housing ring gear relative to the output element/cam follower and eccentric where the position of the motor shaft is illustrated by associated arrow at 135° rotation.

FIG. 5E is a partially schematic top plan view of the mechanical drive illustrating the position of the cycloid gear and housing ring gear relative to the output element/cam follower and eccentric where the position of the motor shaft is illustrated by associated arrow at 180° rotation.

FIG. 5F is a partially schematic top plan view of the mechanical drive illustrating the position of the cycloid gear and housing ring gear relative to the output element/cam follower and eccentric where the position of the motor shaft is illustrated by associated arrow at 225° rotation.

FIG. 5G is a partially schematic top plan view of the mechanical drive illustrating the position of the cycloid gear and housing ring gear relative to the output element/cam follower and eccentric where the position of the motor shaft is illustrated by associated arrow at 270° rotation.

FIG. 5H is a partially schematic top plan view of the mechanical drive illustrating the position of the cycloid gear and housing ring gear relative to the output element/cam follower and eccentric where the position of the motor shaft is illustrated by associated arrow at 315° rotation.

FIG. 5I is a partially schematic top plan view of the mechanical drive illustrating the position of the cycloid gear and housing ring gear relative to the output element/cam follower and eccentric where the position of the motor shaft is illustrated by associated arrow at 360° rotation.

Corresponding reference numerals will be used throughout the several figures of the drawings.

DESCRIPTION OF THE PREFERRED EMBODIMENTS

Figure 1:
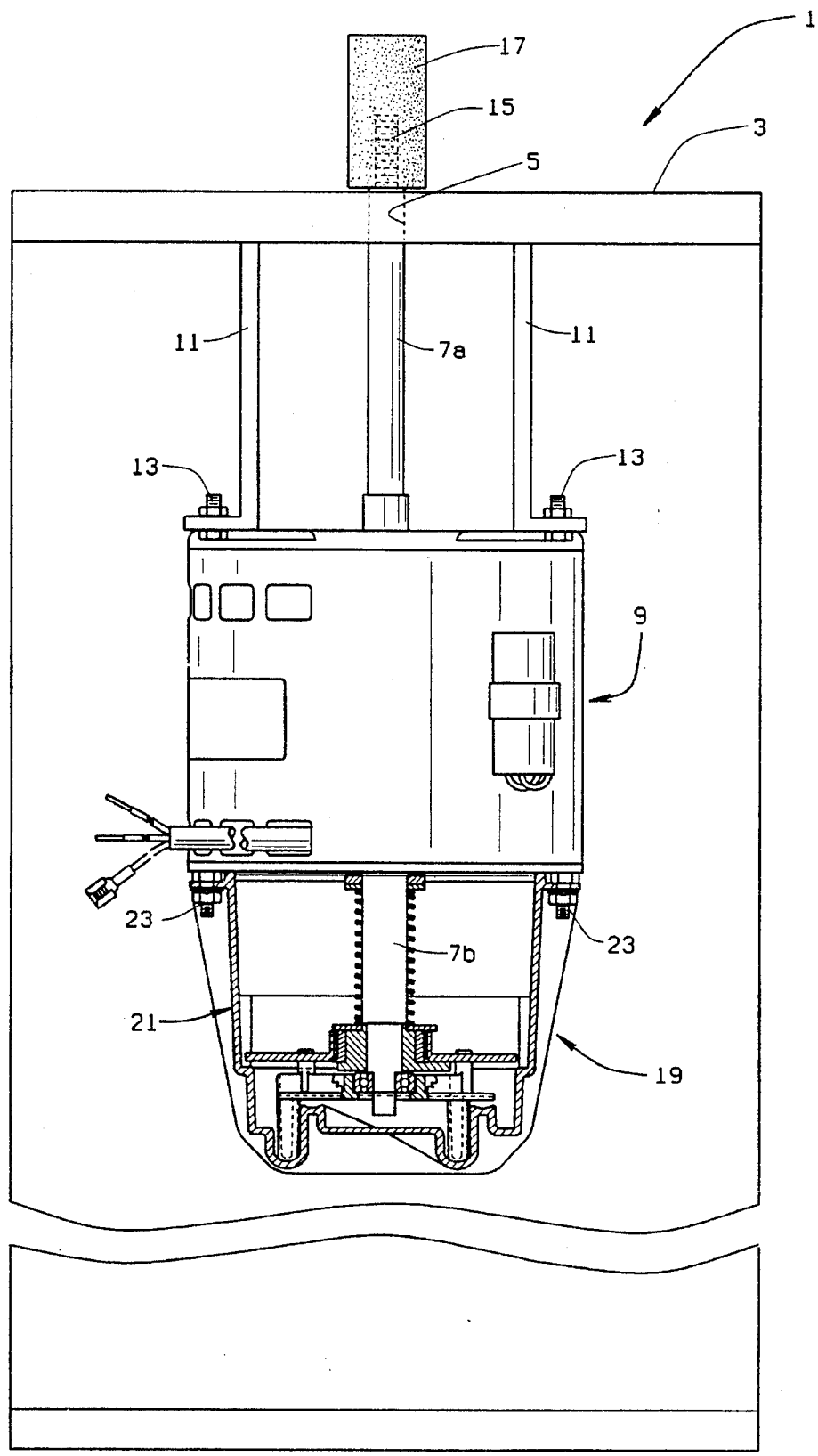
FIG. 1 is a fragmentary side elevational view, partly in section, of the combined motor and mechanical drive that is used in an oscillating spindle sander.

The following detailed description illustrates the invention by way of example and not by way of limitation. The description will clearly enable one skilled in the art to make and use the invention, and describes several embodiments, adaptions, variations, alternatives and uses of the invention, including what we presently believe is the best mode of carrying out the invention.

Although the combined motor and mechanical drive is illustrated in the drawings as being usable with an oscillating spindle sander, it will be understood that there are other contemplated uses as well, as will be apparent.

An oscillating spindle sander 1 is illustrated in FIG. 1 of the drawings and includes a worktable 3 supported by a suitable frame. The worktable 3 has a hole 5 extending therethrough for receiving the output shaft 7a of a motor 9 that is supported below the worktable 3. The motor 9 is supported, for example, by suitable frame supports 11, 11, that extend between the worktable 3 and the motor 9. Suitable fasteners 13, 13 connect the frame supports 11, 11 to the motor 9. The output motor shaft 7a extends upwardly through hole 5 in the worktable 3 and terminates in an outer threaded end 15 which is complementary threaded to a sander drum 17. Typically, the sander drum 17 is sized so that there is no gap between the bottom of the sander drum 17 and the top of the worktable 3, in order that the sanding surface of the sander drum 17 is in close proximity to the top of the worktable 3 when the spindle sander 1 operates.

As will be explained in detail below, the sander drum 17 both rotates and reciprocates for the purpose of sanding the edges of a workpiece (not shown) that is supported by the worktable 3 in a typical manner. In order to accomplish this combined rotational and reciprocating movement for the sander drum 17, the output motor shaft 7a is rotated by the motor 9 while the motor shaft 7a is also driven axially, through the unique construction of the mechanical drive 19 to provide a combined motor and mechanical drive, as will now be described in detail.

The mechanical drive 19 for use with the combined motor in the present invention includes a housing 21 which is connected to the lower end of the motor 9 through the fasteners 23, 23. A lower motor shaft 7b depends from the motor 9 into the housing 21. Of course, the lower motor shaft 7b is integrally connected to the output motor shaft 7a through motor 9, as will be apparent.

Thrust washers 25, 27, at an upper end of the lower motor shaft 7b adjacent the motor 9 and a lower thrust washer 29 extend on opposite sides of a coil spring 31 that surrounds the lower motor shaft 7b. The coil spring 31 enables the lower motor shaft 7b to move axially upwardly and downwardly through the mechanism now to be described, with resilient collapsing and expansion of the coil spring 31 during the axial upward and downward movement of the lower motor shaft 7b.

Figure 4:
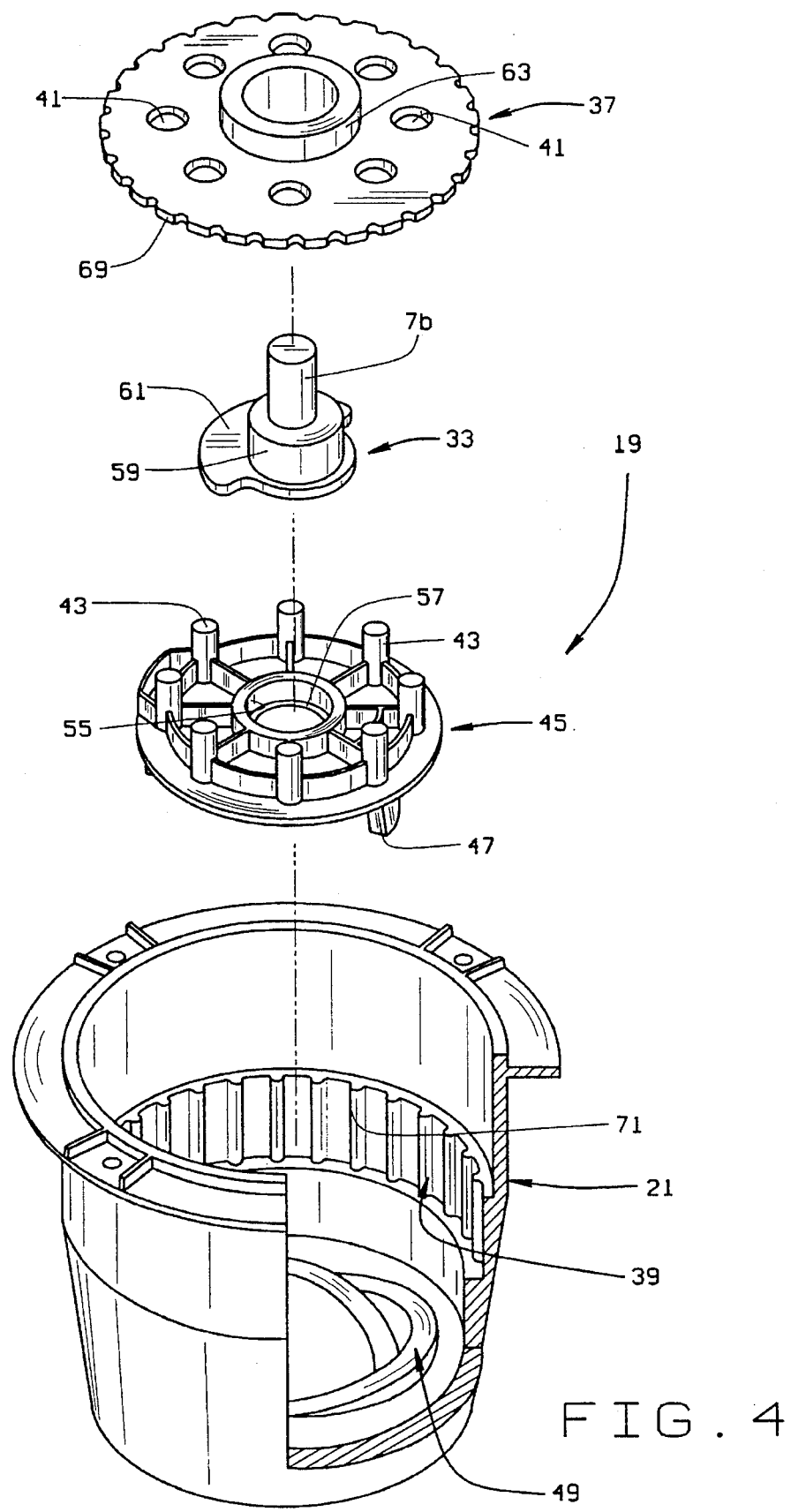
FIG. 4 is an exploded perspective view of the components of the mechanical drive.

To provide this upward and downward axial movement of the lower motor shaft 7b, the mechanical drive 19 includes a speed reducer that is coaxial with the lower motor shaft 7b. The speed reducer includes an eccentric 33 that is mounted on a first reduced shaft portion 35. A cycloidal gear 37 is mounted on the eccentric 33 and is sized and constructed to engage a ring gear 39 mounted on the internal wall of the housing 21, as best seen in FIG. 4. Holes 41 in the cycloidal gear 37 drive the pins 43 of the cam follower 45. Depending legs 47 extend downwardly from the cam follower 45 and engage a cam profile 49 molded into the internal bottom wall section of the housing 21.

Figure 2:
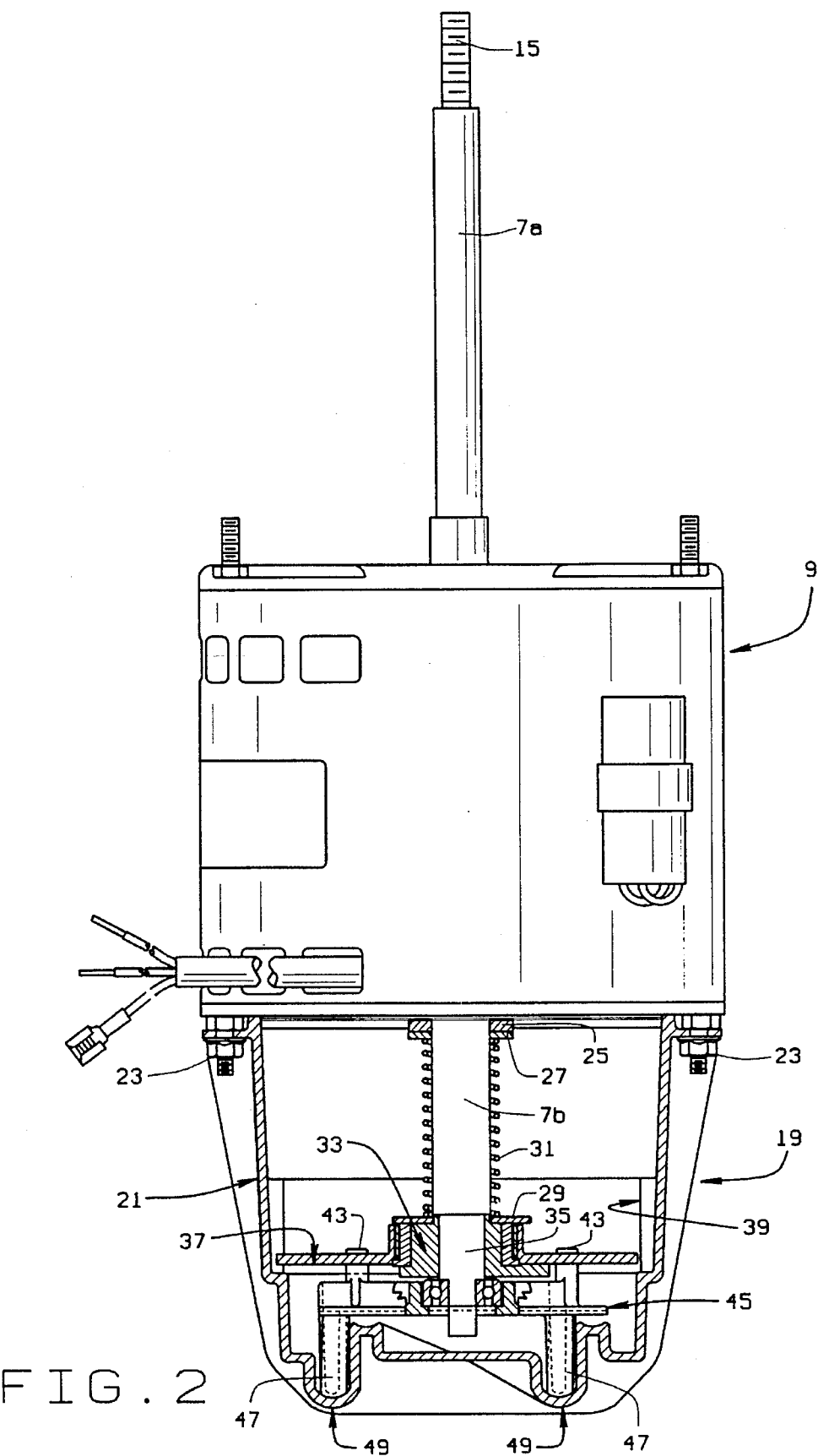
FIG. 2 is an enlarged side elevational view, partly in section, of the combined motor and mechanical drive.
Figure 3:
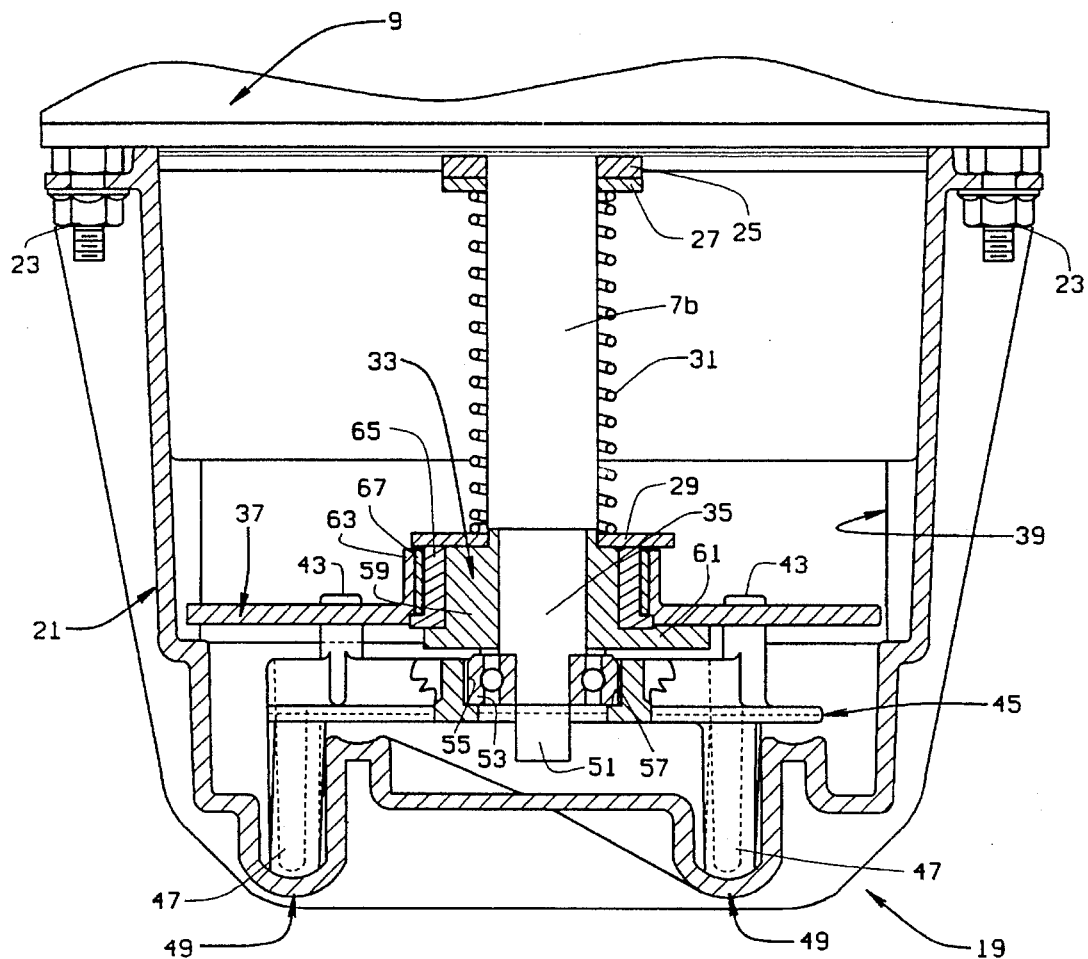
FIG. 3 is a fragmentary side elevational view, principally in section, illustrating the construction of the mechanical drive.

With the above general description of the components forming the mechanical drive, reference is further made to FIGS. 2–4 of the drawings for the specific construction of such components. More particularly, the lower motor shaft 7b, in addition to the first reduced shaft section 35 upon which the eccentric 33 is mounted, includes a second reduced shaft section 51 which is received within the ball bearing 53, the latter being supported by the cam follower 45. Note that the bearing 53 is received within a central opening 55 of the cam follower 45 with the ball bearing 53 resting on a restricted or internal shoulder 57 adjacent a lower inner end of the central opening 55. Thus, the ball bearing 53 rests on the restricted or internal shoulder 57 of the cam follower 45 while rotatably supporting the second reduced section 51 of the lower motor shaft 7b, as will be apparent.

The eccentric 33 includes an eccentric portion 59 that is integrally formed with a lower offset flange 61 that underlies the cycloidal gear 37, as best seen in FIGS. 2–3 of the drawings. The cycloidal gear 37 includes an integral upstanding collar 63 which is arranged to fit over the eccentric portion 59 of the eccentric 33. Positioned intermediate the eccentric portion 59 and the upstanding collar 63 is bushing 65 and splined element 67 for fixedly mounting the cycloidal gear 37, through the upstanding collar 63, to the eccentric portion 59 of the eccentric 33. As a result, the cycloidal gear 37 will be jointly rotated when the eccentric 33 is rotated by the lower motor shaft 7b.

The eccentric 33 is driven at motor speed through the lower motor shaft 7b, and as it rotates, the eccentric 33 pushes the teeth 69 of the cycloidal gear 37 into engagement with the gear teeth 71 of the stationary ring gear 39 molded on an internal wall of the housing 21. The cycloidal gear 37 has one less tooth 69 than the gear teeth 71 of the ring gear 39. In the illustrated embodiment, the cycloidal gear 37 has twenty-nine (29) teeth while the ring gear 39 has thirty (30) teeth. As a result, the cycloidal gear 37 makes one-thirtieth (¹⁄₃₀) of a revolution in the opposition direction as the motor shaft 7b makes one complete revolution. However, since the cycloidal gear is off-center from the lower motor shaft 7b, due to the mounting of same on the eccentric portion 59 of the eccentric 33, the speed reducer employs an additional element to arrive at a true rotational output.

The output element is in the form of upstanding pins 43 which extend upwardly into the cam follower 45 that are driven by the holes 41 in the cycloidal gear. The gear holes 41 are sized so that at all times there is line contact between each hole 41 and corresponding pin 43. As will become more apparent from the discussion in connection with FIGS. 5A through 5I of the drawings that follow, this provides a constant-velocity joint.

The end result of the cycloidal gear reduction is that the cam follower 45 rotates at one-thirtieth (¹⁄₃₀) of the motor speed. Depending legs 47 incorporated into the cam follower 45 are constructed to follow a cam profile 49 which is molded into the internal bottom wall of the housing 21, as best seen in FIG. 4. The cam profile 49 provides a gradual serpentine rise and decline for driving the motor shaft 7b axially, in order to reciprocate same.

The cycloidal mechanical drive 19 transmits power equal to that of gears, but in a smaller and more efficient package. In contrast to the circular motion of gears, the cycloidal drive mechanism uses the eccentric 33 to convert input rotation from the lower motor shaft 7b into a wobbly cycloidal motion. This cycloidal motion is then converted back into smooth, concentric output rotation. In the process, speed reduction occurs.

The term cycloidal is derived from hypocycloidal, which is defined as the curve traced by a point on the circumference of a circle that is rotating inside the circumference of a larger fixed circle. A common example of this motion is the path traced by a tooth of a planetary pinion rotating inside a ring gear.

While worm gearing experiences a dramatic loss of efficiency in going from low to high output input/output speed ratios, and helical gearing loses efficiency of high ratios because two or more stages of reduction are required, cycloidal drives achieve reduction rates as high as 200:1 in a single stage, while still maintaining moderately high efficiencies. Moreover, because cycloidal drive components interact in a rolling fashion, failure is generally not catastrophic. As in a bearing, fatigue in the rolling surfaces of a cycloidal drive causes noise levels to gradually increase, serving as a warning long before complete drive failure occurs.

Heat generation, attributable mainly to mechanical losses and the power being transmitted, is readily dissipated through the large surface area of other types of gears. But cycloidal drives, like worm gears, must dissipate heat through a smaller housing surface area. However, since efficiency in cycloidal drives is higher than worm gearing of equal capacity and ratio, less heat is generated in cycloidal units. Consequently, the auxiliary cooling often required for worm units is usually not needed for cycloidal drives. Although not as efficient as spur or helical gearing, cycloidal drives offer substantially higher efficiency than worm gearing. The concentric shaft orientation also proves valuable, as do the cycloidal drives compact size and high reduction capability.

Reference is now made to FIGS. 5A through 5I of the drawings which illustrate various positions of the cycloid gear 37 and housing ring gear 39 relative to the pins 43 of the cam follower 45, eccentric 33 and shaft 7b for an explanation of the various relative position of such components during a single revolution of the lower motor shaft 7b from 0° to 360°.

FIGS. 5A through 5C show rotation of the lower motor shaft 7b from 0° to 45° to 90°, with the associated arrow demonstrating the various rotational positions of the lower motor shaft 7b relative to the eccentric 33 and the pins 43 of the cam follower 45 which respect to the holes 41 of the cycloidal gear 37 and its relative position to the ring gear 39. As previously explained, the cycloidal gear 37 rotates one-thirtieth (¹⁄₃₀) of a revolution in the opposition direction as the lower motor shaft 7b makes on complete revolution. FIGS. 5A through 5C show approximately one-quarter (¼) of a revolution of the lower motor shaft 7b.

FIGS. 5D through 5F show the relative position of the parts at 135°, 180° and 225°, respectively. Similarly, FIGS. 5G through 5I of the drawings illustrates the motor shaft at positions of 270°, 315° and 360° respectively.

Since the cycloidal gear 37 is off center from the lower motor shaft 7b due to the eccentric 33, the pins 43 of the cam follower 45 are driven by the holes 41 in the cycloidal gear 37. As can be seen in analyzing FIGS. 5A through 5I of the drawings, the gear holes 41 are sized so that at all times there is a line contact between each hole 41 and corresponding pin 43. This is what produces a constant velocity joint with the end result of cycloidal gear reduction where the cam follower 45 rotates at one-thirtieth (¹⁄₃₀) of the motor speed. Axial movement is made possible through the depending legs 47 that extend downwardly from the cam follower 45 for engagement with the cam profile 49 in the inner bottom wall of the housing 21. This produces the desired axial or reciprocating movement of the lower motor shaft 7b, as well as in the output motor shaft 7a, while the output motor shaft 7a is also rotated by the motor 9.

From the foregoing, it will be appreciated that the combined motor 9 and mechanical drive 19 provides speed reduction through the cycloidal gear mechanism. The output element of the gear train, namely the holes and pins in the cycloidal gear and cam follower, respectively, drives the cam follower to track the cam profile in the lower inner bottom wall of the housing. This drives the motor shaft axially during rotation of the motor shaft by the motor. The end result is a motor shaft that rotates at motor speed, while oscillating by reciprocating or axially moving at a rate much lower than the motor speed. In the illustrated embodiment, the oscillation or reciprocation of the motor shaft axially is at one-thirtieth (1/30) of the motor speed.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

We claim:

1. A combined motor and mechanical drive that imparts both axial and rotational motion to a motor shaft including an output motor shaft end and an input motor shaft end, said mechanical drive being supported by the motor as well as being connected to the motor shaft through the input motor shaft end for imparting axial motion to the output motor shaft end during rotation of said motor shaft by said motor, said mechanical drive being contained within a housing that is supported by the motor, and said mechanical drive including means for imparting axial motion to the output motor shaft end at a rate substantially less than the rotational speed of the output motor shaft end.

2. The combined motor and mechanical drive as defined in claim 1 wherein the mechanical drive is operably interconnected to said housing.

3. The combined motor and mechanical drive as defined in claim 1 wherein the mechanical drive is operably interconnected to both said input motor shaft end and said housing.

4. The combined motor and mechanical drive as defined in claim 1 wherein the mechanical drive includes a speed reducer that drives a cam follower, said cam follower engaging a cam in the housing for imparting axial motion to the motor shaft during rotation thereof.

5. The combined motor and mechanical drive as defined in claim 4 wherein the speed reducer further includes a cycloidal gear having at least one less gear tooth than a complementary ring gear provided in the housing.

6. A sander having a worktable for supporting a workpiece, a motor shaft extending upwardly through said worktable and supporting a sanding surface, motor means for transmitting rotational and reciprocal motion to said motor shaft and including input and output motor shaft ends, said motor means including an electrical motor for imparting rotational motion through said output motor shaft end, and a mechanical drive contained within a housing that is mounted to the motor, said mechanical drive being connected to the input motor shaft end of said motor for also imparting reciprocal motion through said output motor shaft end, said mechanical drive being constructed to impart axial motion to the output motor shaft end at a rate substantially less than the rotational speed of the output motor shaft end.

7. The sander as defined in claim 6 wherein said input motor shaft end is interconnected to said mechanical drive which is operably interconnected to said housing for also imparting reciprocal motion to said output motor shaft end.

8. The sander as defined in claim 7 wherein the motor shaft drives a speed reducer that is coaxial with the motor shaft, said speed reducer driving a cam follower that engages a cam in the housing for imparting the reciprocal motion through said output motor shaft end.

9. The sander as defined in claim 8 wherein the speed reducer includes a cycloidal gear that engages a complementary ring gear provided in the housing.

10. A sander having a worktable for supporting a workpiece, a motor shaft extending upwardly through said worktable and supporting a sanding surface, an electrical motor supported by said worktable and driving said motor shaft, said motor shaft having an output motor shaft end and an input motor shaft end, and a mechanical drive supported by and below said motor that is connected to said input motor shaft end for imparting axial motion to said output motor shaft end during rotation of said motor shaft, said mechanical drive being contained within a housing that is supported below the motor and being connected to both said input motor shaft end and said housing for imparting axial motion to said output motor shaft end, and said mechanical drive including means for imparting axial motion to said output motor shaft end at a rate substantially less than the rotational speed of the output motor shaft end.

11. The sander as defined in claim 10 wherein the input motor shaft end drives a speed reducer within said housing, said speed reducer driving a cam follower that engages a cam in the housing for imparting axial motion to the rotating output motor shaft end.

12. The sander as defined in claim 11 wherein the speed reducer includes a cycloidal gear that engages a complementary ring gear provided in the housing.

13. The sander as defined in claim 10 wherein the input motor shaft end includes an eccentric that drives the gear teeth of the cycloidal gear into engagement with corresponding gear teeth in the ring gear, said cycloidal gear also driving said cam follower into engagement with the cam provided in the housing.

14. The sander as defined in claim 13 wherein the cycloidal gear has less teeth than the ring gear.

15. The sander as defined in claim 14 wherein the cam follower includes depending leg portions for engaging the cam provided in the housing.

16. The sander as defined in claim 15 wherein the cam follower includes pins for engaging corresponding holes in the cycloidal gear, said holes being sized to provide continuous line contact between each pin and hole.

17. A sander having a worktable for supporting a workpiece, a motor shaft extending upwardly through said worktable and supporting a sanding surface, an electrical motor supported by said worktable and driving said motor shaft including an upper output shaft portion integral with a lower motor shaft portion, the lower motor shaft portion being connected to a mechanical drive that is contained within a housing supported by and below the motor, said mechanical drive being operative to impart axial motion to the upper output shaft portion at a rate much less than the rotational speed imparted to the upper output shaft portion by the motor.

18. A sander having a worktable for supporting a workpiece, a motor shaft extending upwardly through said worktable and supporting a sanding element, an electrical motor supported by and below said worktable and driving said motor shaft through upper and lower ends of the motor to define upper and lower integral shaft portions, the lower shaft portion being connected to a mechanical drive that is contained within a housing supported by and below said motor, said mechanical drive including an eccentric that engages a cycloidal gear for engagement with a ring gear provided in the housing, said cycloidal gear having less gear teeth than the ring gear, said cycloidal gear driving a cam follower into engagement with a cam provided in the housing, whereby the mechanical drive imparts an axial motion to the upper shaft portion at a rate much less than the rotational speed imparted to the upper shaft portion by the motor.

* * * * *